(12) United States Patent
Rick

(10) Patent No.: US 9,102,304 B2
(45) Date of Patent: Aug. 11, 2015

(54) PROTECTIVE DEVICE FOR A MOTOR VEHICLE

(71) Applicant: GM GLOBAL TECHNOLOGY OPERATIONS LLC, Detroit, MI (US)

(72) Inventor: Ulrich Rick, Braunweiler (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 66 days.

(21) Appl. No.: 13/780,905

(22) Filed: Feb. 28, 2013

(65) Prior Publication Data

US 2013/0234424 A1 Sep. 12, 2013

(30) Foreign Application Priority Data

Mar. 8, 2012 (DE) .......................... 10 2012 004 796

(51) Int. Cl.
*B60J 11/00* (2006.01)
*B60R 21/36* (2011.01)
*B60R 21/235* (2006.01)
*B60R 21/00* (2006.01)
*B60R 21/16* (2006.01)

(52) U.S. Cl.
CPC .............. *B60R 21/36* (2013.01); *B60R 21/235* (2013.01); *B60R 2021/0027* (2013.01); *B60R 2021/165* (2013.01); *B60R 2021/23504* (2013.01)

(58) Field of Classification Search
USPC ......... 280/731, 731.1, 731.2, 732, 740, 728.1
See application file for complete search history.

(56) References Cited

U.S. PATENT DOCUMENTS

| 5,308,113 A | * | 5/1994 | Moriset ...................... 280/743.2 |
| 5,863,644 A | | 1/1999 | Boenigk et al. |
| 5,879,767 A | | 3/1999 | Matsushima et al. |
| 6,250,668 B1 | * | 6/2001 | Breed et al. ................ 280/730.2 |
| 7,401,811 B2 | | 7/2008 | Nagai et al. |
| 7,681,917 B2 | | 3/2010 | Guillo et al. |
| 2006/0066088 A1 | * | 3/2006 | Hier et al. ................... 280/743.1 |
| 2008/0147278 A1 | | 6/2008 | Breed |
| 2011/0148080 A1 | | 6/2011 | Marable et al. |

FOREIGN PATENT DOCUMENTS

| GB | 2493435 A | 2/2013 |
| GB | 2495811 A | 4/2013 |
| GB | 2495812 A | 4/2013 |

OTHER PUBLICATIONS

German Patent Office, German Search Report for German Application No. 10 2012 004 796.7 dated Jan. 16, 2013.

* cited by examiner

*Primary Examiner* — John Walters
*Assistant Examiner* — James Triggs
(74) *Attorney, Agent, or Firm* — Ingrassia Fisher & Lorenz PC

(57) ABSTRACT

A protective device has a gas generator and a chamber that is limited by a stretchable membrane and is expandable through gas of the gas generator. The membrane is elastic and a stretchability of the membrane is limited at least in a first portion through a reinforcement.

12 Claims, 2 Drawing Sheets

PROTECTIVE DEVICE FOR A MOTOR VEHICLE

CROSS-REFERENCE TO RELATED APPLICATION

This application claims priority to German Patent Application No. 102012004796.7, filed Mar. 8, 2012, which is incorporated herein by reference in its entirety.

TECHNICAL FIELD

The technical field relates to a protective device, in particular for protecting persons within or outside a motor vehicle during an accident.

BACKGROUND

Airbag arrangements, having an airbag and a gas generator, which is ignited during an accident in order to expand the airbag have been employed in motor vehicles for many years. Folded up tightly, the airbag is accommodated in a housing through which it bursts open by expansion when operated. Generally speaking, folding up the airbag again after use and replacing it in the housing is generally not possible so that even if the fabric of the airbag is not overused through the impact of a person and still intact, the complete airbag arrangement has to be exchanged at great expenditure.

It would be desirable, per se, to have an airbag arrangement in which the airbag is able to return into its installation space after an expansion. It would be conceivable to produce such an airbag from a rubber-elastic membrane instead of from a non-stretchable fabric as is conventionally the case, which re-contracts after an expansion, returning to its rest configuration. A problem of such a rubber-elastic membrane however is that when a person impacts a part of the membrane, the gas enclosed by the membrane can give way in that it further inflates a part of the membrane that is not obstructed in its stretching by the contact with the person. This can substantially impair the deceleration effect of the airbag arrangement.

From DE 10 2010 062 088 A1 an airbag arrangement is known, in which a part of the airbag membrane, on which a head impact is expected, is stretchable in order to be able to protectively catch the head. This stretchable region however forms only a small part of the airbag. The non-stretchable remainder cannot contribute to the airbag again returning into its rest configuration after an expansion. Neither is there any indication that the stretching of this stretchable region is reversible. A return of the airbag into its rest configuration is therefore not possible here either.

At least one object herein is to create a protective device having a gas generator and a chamber that can be expanded through the gas generator, which after an expansion of the chamber can return to its starting configuration and in which the risk that the gas of the chamber gives way to an impact is avoided. In addition, other objects, desirable features and characteristics will become apparent from the subsequent summary and detailed description, and the appended claims, taken in conjunction with the accompanying drawings and this background.

SUMMARY

In accordance with an exemplary embodiment, with a protective device having a gas generator and a chamber, which is limited by a stretchable membrane and expandable by gas of the gas generator, the membrane is elastic and the stretchability of the membrane is limited by a reinforcement at least in a first portion of the membrane.

The membrane can comprise a second portion, which is reinforcement-free in that in a portion of the membrane which is not at risk of being overstretched during an impact the reinforcement is omitted The space requirement of the membrane in the rest position can be minimized.

The reinforcement can be arranged on an outside of the membrane so that when the chamber is expanded, the membrane is pressed against the reinforcement from the inside and as a result prevented from stretching further.

Such a reinforcement can loosely embrace the membrane in the rest position, but it can also be entirely or partially glued to the membrane or fastened to the membrane in another way if such is required in order to control the movement of the reinforcement during the expansion of the chamber. Alternatively, the reinforcement can also be embedded in the membrane.

In an embodiment, a gas inlet opening of the chamber is formed in the reinforced first portion. Thus, the reinforcement can additionally contribute to the protection of the membrane when the latter during the expansion has to pass sharp edges or other obstacles on which the membrane could be damaged.

In the expanded state, the chamber extends in front of a hard surface in order to catch a person before such person strikes through the hard surface. The reinforcement-free second portion can be located on a side of the chamber facing the hard surface, for when a person impacts, the second portion is pressed against the hard surface as a result and because of this is prevented from stretching further.

Conversely, the second portion can also be located on a side of the chamber facing away from the hard surface when it can be assumed that it is limited in its stretching through contact with the person to be caught.

In an embodiment, the first portion once expanded as far as to the stretch limitation comprises a region tapering towards the second portion, which when a person impacts, depending on orientation of the second portion, comes in contact either with the person or the hard surface round about it.

A reinforcement sagging material and installation space practically comprise a net structure in accordance with an embodiment.

The reinforcement can consist of a textile material, of individual threads, bands or fabric pieces.

When the protective device is installed in a motor vehicle, a part of the outer skin of the motor vehicle can form the mentioned hard surface.

When the protective device is employed on the vehicle outside, it cannot be securely predicted where it will possibly be impacted by a person. For this reason, the non-reinforced second portion is facing the outer skin of the motor vehicle in accordance with an embodiment.

When the protective device is installed in a passenger cell of the motor vehicle, the second portion of the membrane can also be facing away from the hard surface and facing an impacting vehicle occupant.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
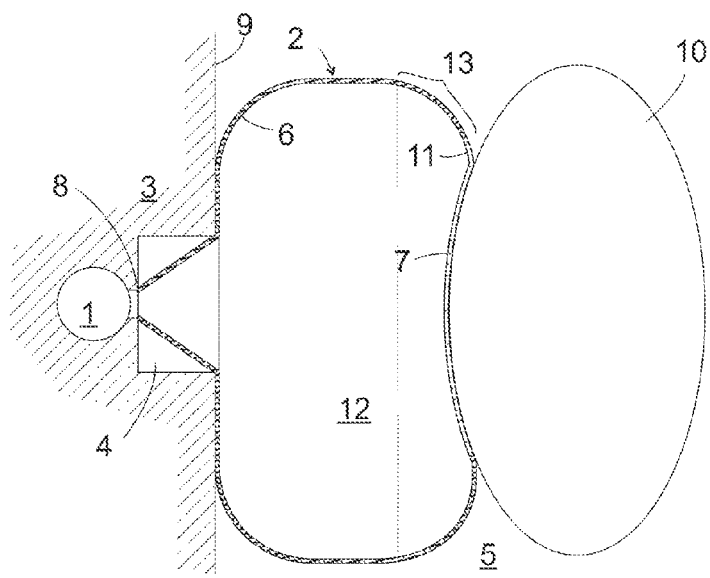
FIG. 1 illustrates a schematic section through a protective device in the expanded state in accordance with an exemplary embodiment.

FIG. 1 shows a highly schematic section through a protective device according to an exemplary embodiment. The protective device is installed in the passenger cell of a motor vehicle, for example in a steering wheel or, in the case considered here, in an instrument panel 3. The protective device comprises a gas generator 1 and a gas bag 2, which in the state of rest is accommodated in a housing 4 sunk into the instrument panel 3. In the state of rest, the housing 4 is closed off by a cover which is not shown in the Figure, or a covering of the instrument panel 3 extending over the housing 4. The cover or covering can comprise a weak point at the height of the chamber 4 which, when the gas generator 1 is ignited and the gas bag 2 starts to expand, tears open, allowing the gas bag 2 to expand into the passenger cell 5 as shown in the Figure.

The wall of the gas bag 2 comprises a rubber-elastic membrane 19 (see for example FIG. 3), which is stretch-limited in a portion 6 of the gas bag 2 by a reinforcement, while in a portion 7 such a reinforcement is missing. Starting out from an inlet opening 8 connected to the gas generator 1, the reinforced portion 6 of the expanded gas bag 2 extends through the housing 4, thus protecting the membrane 19 from damage when it spills out of the housing 4 possibly past sharp edges of the covering 9. The reinforced portion 6 partially rests on the covering 9 of the instrument panel 3 and substantially forms the entire surface of the gas bag 2 that is exposed between the covering 9 and an impacting body 10 of a passenger.

The portion 7 is located on a part of the gas bag 2 facing away from the gas inlet opening 8 and is dimensioned so that it is completely or at least substantially completely covered by the impacting body 10. Minor marginal regions that are not covered, such as designated 11 in FIG. 1, do not substantially influence the deformation of the gas bag under the impact of the body 10, for although this marginal region 11, other than the portion 6 that is obstructed from further stretching through the reinforcement, could stretch further under the pressure of the body 10, a stretching in this case only leads to a minor growth in volume of the gas bag 2. As a consequence of this, a very high positive pressure is required in the chamber 12 enclosed by the gas bag 2 for a further stretching of the marginal region 11, which in practice is not reached even for the reason that under the pressure of the body 10 gas escapes from the chamber 12 via throttle points which are not shown in order to render the impact of the body 10 inelastic.

As is clearly visible in FIG. 1, the reinforced portion 6 between a region of maximum diameter and the non-reinforced portion 7 comprises a region 13 which tapers towards the portion 7. This region 13 ensures that the portion 7 remains small enough in order to be completely or at least substantially completely covered by the body 10, and because of this can be prevented from excessive stretching.

Figure 2:
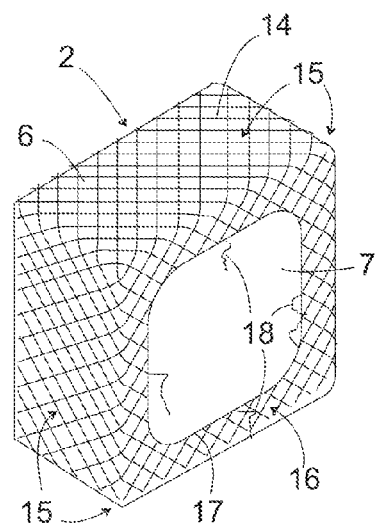
FIG. 2 is a schematic perspective view of an expanded chamber of the protective device of FIG. 1.

FIG. 2 shows a schematic perspective view of the expanded gas bag 2 according to an embodiment. The cuboid shape of the gas bag 2 shown here can materialize when the reinforced portion is joined together from a plurality of cuttings jointed together at their edges, of which each forms one of the four narrow sides 15 of the cuboid. When the gas bag 2 comprises a one-piece rubber-elastic membrane, a rather balloon-like shape of the expanded gas bag 2 is obtained.

In another embodiment, the reinforcement already mentioned above in this case is formed through a net 14 of fibers that can be subjected to high tensile load, for example fibers of aramid, which net is stretched over the back facing the instrument panel covering 9 which is not shown in the Figure, the narrow sides 15 and a part of the front 16 of the gas bag. In particular at the gas inlet opening 8 and in that part of the gas bag 2 directly adjoining the gas inlet opening 8, which in the expanded states extends through the housing, the reinforcement can also be formed through metal wires. The net 14 is not connected in a fixed manner to a rubber membrane which it encloses; when the membrane expands under the influence of inflowing gas it pushes the net 14 ahead in front of it.

In the expanded state of FIG. 2, the net 14 has a large-area opening surrounded by a seam 17, which defines the non-reinforced portion 7 of the membrane in an embodiment. In order to prevent that the membrane during its expansion passes through this opening without pulling the net 14 along with it, marginal regions of the hem 17 located opposite one another can be fastened to one another through destructible connections, e.g. with the help of threads, which tear open under the pressure of the membrane at a later stage of the expansion when the net 14 has been firmly filled, and the remains 18 of which are visible on the edges of the hem 17.

Figures 3, 4:
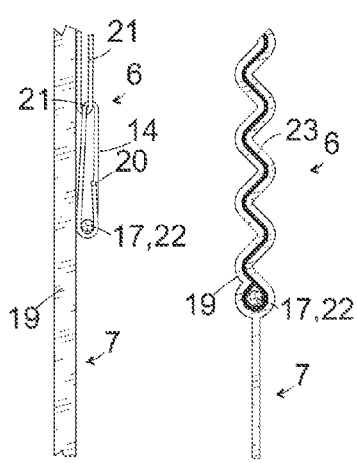
FIG. 3 illustrates in cross section a wall of the chamber of the protective device of FIG. 1 according to an embodiment.
FIG. 4 illustrates in cross section a wall of the chamber of the protective device of FIG. 1 according to another embodiment.

FIG. 3 illustrates in cross-sectional view the construction of the wall of the gas bag 2 in accordance with an exemplary embodiment. The already mentioned membrane, here marked with 19, of natural or synthetic rubber, extends in one piece over both portions 6, 7. The net 14 is held on the outside of the membrane 19 through positively bonded connection. The threads 20 forming the net can in particular have a certain intrinsic stiffness, be loosely entwined about one another at points of intersection 21 and about a thread or wire 22 forming the hem 17; in order to be able to guarantee a uniform mesh size of the net 14 in the expanded state, they can also be knotted at their points of intersection 21 or fixed to one another and to the hem 17 in another suitable manner.

According to an alternative embodiment shown in cross section in FIG. 4, the reinforcement can also be formed through flexible threads or bands 23, which are embedded in the material of the rubber-elastic membrane 19 in its portion 6. While these threads or bands 23 in the stretch-limited state can be generally stretched out linearly, they can assume a curled or spiral-shaped configuration in the state not yet expanded to the stretch limit as shown in FIG. 4.

Figure 5:
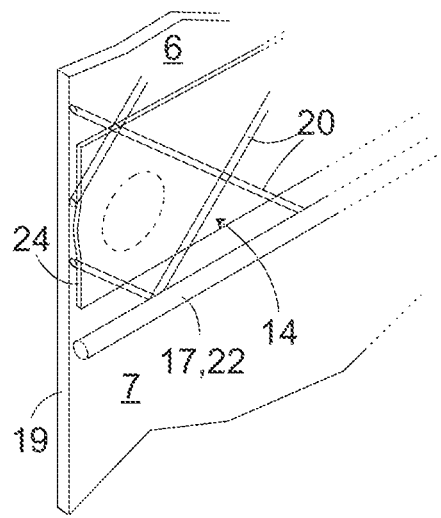
FIG. 5 schematically illustrates a wall of the chamber according to a further embodiment.

FIG. 5 again shows a configuration of the wall, in which the reinforcement is formed through a net 14 fixed to an outside of the membrane 19. Here, the net 14 is held by a strip 24, which like the membrane 19 consists of rubber-elastic material, extends along the hem 17 and in each case is fastened in the meshes of the net 14 to the membrane 19 through spot welds 25 or in another suitable manner.

Figure 6:
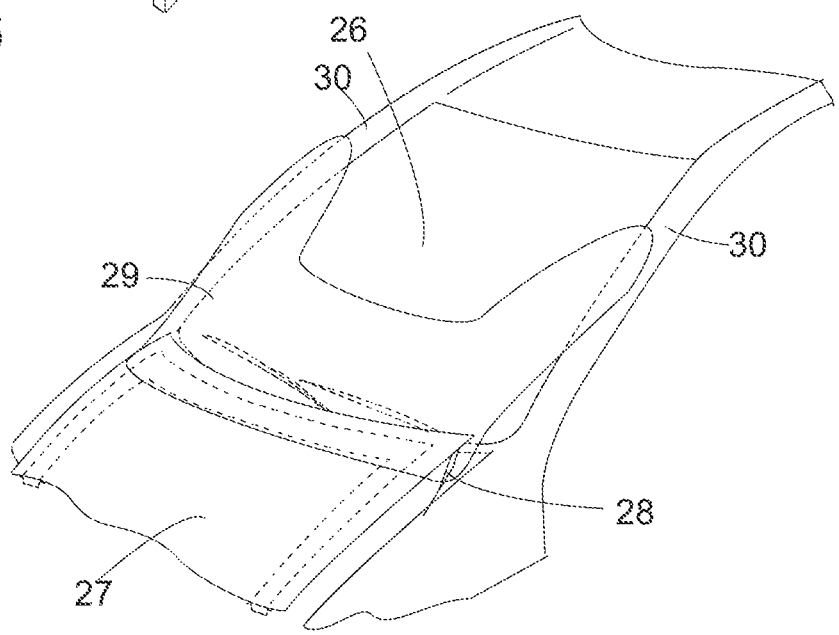
FIG. 6 schematically illustrates a protective device mounted to the outside of a vehicle body in the expanded state in accordance with an embodiment.

FIG. 6 shows a schematic view of a protective device according to an embodiment which is effective on the outside of a motor vehicle body. The gas bag 29 shown expanded here is accommodated in a water box in the non-expanded state of rest, which water box extends at the foot of a windshield 26 of the body under the rear edge of an engine hood 27. A hinge 28, about which the engine hood 27 can be normally pivoted about an axis that is adjacent to its rear edge, is unlocked, driven by the gas generator of the protective device, so that the expanding gas bag 29 can lift the engine hood 27 and through the gap created thus, can spread over the windshield 26 and A-pillars 30 adjoining thereto.

Figure 7:
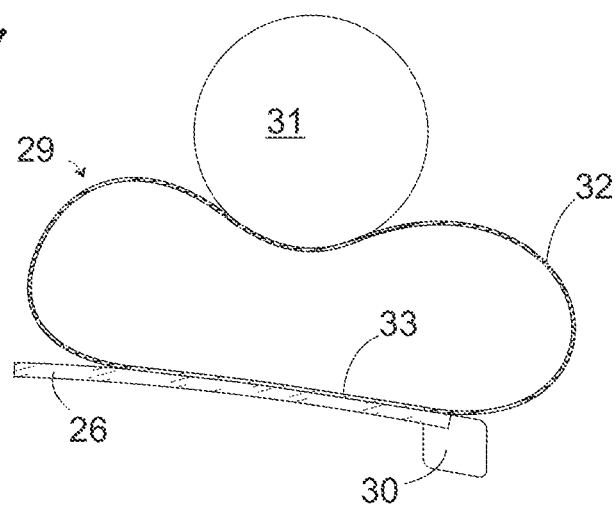
FIG. 7 is a cross-sectional view through the protective device from FIG. 6.

FIG. 7 shows a schematic section through a lateral wing of the expanded gas bag 29 at the moment of the impact of an impactor 31. As with the embodiments considered above, the gas bag 29 also comprises a reinforced portion 32 and a reinforcement-free portion 33. Other than in the embodiment of FIG. 1, the reinforcement-free portion 33 however does not face the impacting impactor 31, but the windshield 26. Under the pressure of the impactor 31, the portion 33 hugs the windshield 26 over its full area and because of the friction resulting from this is prevented from stretching further.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

The invention claimed is:

1. A protective device comprising:
   a gas generator; and
   a chamber that is limited by a stretchable membrane and expandable through gas of the gas generator,
   wherein the membrane is elastic and a stretchability of the membrane is limited at least in a first portion through a reinforcement, and a gas inlet opening of the chamber is formed in the first portion.

2. The protective device according to claim 1, wherein the reinforcement is arranged on an outside of the membrane.

3. The protective device according to claim 1, wherein the reinforcement is embedded in the membrane.

4. The protective device according to claim 1, wherein a second portion is free of reinforcement.

5. The protective device according to claim 4, further comprising a hard surface in front of which the chamber extends in the expanded state, wherein the second portion is located on a side of the chamber facing the hard surface.

6. The protective device according to claim 4, further comprising a hard surface in front of which the chamber extends in the expanded state, wherein the second portion is located on a side of the chamber facing away from the hard surface.

7. A protective device comprising:
   a gas generator; and
   a chamber that is limited by a stretchable membrane and expandable through gas of the gas generator,
   wherein the membrane is elastic and a stretchability of the membrane is limited at least in a first portion through a reinforcement, the reinforcement is arranged on an outside of the membrane, a second portion is free of reinforcement, and the first portion in the state expanded up to a stretch limitation comprises a region which tapers towards the second portion.

8. The protective device according to claim 7, wherein the reinforcement comprises a net structure.

9. The protective device according to claim 7, wherein the reinforcement comprises a textile material.

10. The protective device according to claim 1, wherein the protective device is installed in a motor vehicle.

11. The protective device according to claim 10, wherein a part of an outer skin of the motor vehicle forms a hard surface in front of which the chamber extends in the expanded state, wherein a second portion that is free of reinforcement is located on a side of the chamber facing the hard surface.

12. The protective device according to claim 10, wherein the protective device is installed in order to expand into a passenger cell of the vehicle.

* * * * *